US012593846B2

(12) United States Patent
Lenz et al.

(10) Patent No.: US 12,593,846 B2
(45) Date of Patent: Apr. 7, 2026

(54) COMBINATIONS OF TRIAZOLONE
HERBICIDES WITH SAFENERS

(71) Applicants: UPL DO BRASIL INDUSTRIA E
COMERCIO DE INSUMOS
AGROPECUARIOS S.A., Ituverava
(BR); UPL Corporation Limited, Port
Louis (MU)

(72) Inventors: Giuvan Lenz, Ituverava (BR);
Ferdinando Marcos Lima Silva,
Ituverava (BR)

(73) Assignees: UPL CORPORATION LIMITED,
Port Louis (MU); UPL DO BRASIL
INDUSTRIA E COMERCIO DE
INSUMOS AGROPECUARIOS S.A.,
Ituverava (BR)

( * ) Notice: Subject to any disclaimer, the term of this
patent is extended or adjusted under 35
U.S.C. 154(b) by 406 days.

(21) Appl. No.: 18/246,896

(22) PCT Filed: Sep. 27, 2021

(86) PCT No.: PCT/BR2021/050414
§ 371 (c)(1),
(2) Date: Mar. 28, 2023

(87) PCT Pub. No.: WO2022/061442
PCT Pub. Date: Mar. 31, 2022

(65) Prior Publication Data
US 2023/0363390 A1 Nov. 16, 2023

(30) Foreign Application Priority Data

Sep. 28, 2020 (BR) .......................... 102020019868-8

(51) Int. Cl.
A01N 43/653 (2006.01)
A01N 25/32 (2006.01)
A01P 13/00 (2006.01)
(52) U.S. Cl.
CPC ........... A01N 43/653 (2013.01); A01N 25/32
(2013.01); A01P 13/00 (2021.08)
(58) Field of Classification Search
CPC ...... A01N 43/653; A01N 37/18; A01N 43/28;
A01N 43/42; A01N 43/54; A01N 43/56;
A01N 43/78; A01N 43/80; A01N 43/84;
A01P 13/00; A01P 13/02
See application file for complete search history.

(56) References Cited

U.S. PATENT DOCUMENTS

| 5,981,432 | A | 11/1999 | Hudetz et al. | |
| 8,822,377 | B2* | 9/2014 | Zagar | A01N 43/90 |
| | | | | 504/138 |
| 2013/0023415 | A1 | 1/2013 | Witschel et al. | |
| 2013/0237418 | A1 | 9/2013 | Feucht et al. | |
| 2019/0116791 | A1* | 4/2019 | Shinn | A01N 43/82 |
| 2019/0254278 | A1 | 8/2019 | Amano et al. | |
| 2023/0363382 | A1 | 11/2023 | Lenz et al. | |
| 2023/0363383 | A1 | 11/2023 | Lenz et al. | |

FOREIGN PATENT DOCUMENTS

| EP | 2243370 | A2 | 10/2010 |
| EP | 2858494 | B1 | 11/2018 |
| WO | 0137652 | A2 | 5/2001 |
| WO | 02060255 | A2 | 8/2002 |
| WO | 03047346 | A1 | 6/2003 |

OTHER PUBLICATIONS

Collins et al. J. Environ. Hort. 2001, 19 (4), 189. (Year: 2001).*
Fedtke, C. et al.; "Synergistic Activity of the Herbicide Safener Dichlormid with Herbicides Affecting Photosynthesis"; Z. Naturforsch, vol. 45c; 1990; pp. 565-567; DOI: https://doi.org/10-1515/znc-1990-0545.
International Search Report and Written Opinion for International Application PCT/BR2021/050412; International Filing Date: Sep. 27, 2021; Date of Mailing: Oct. 28, 2021; 8 pages.
International Search Report and Written Opinion for International Application PCT/BR2021/050413; International Filing Date: Sep. 27, 2021; Date of Mailing: Oct. 28, 2021; 8 pages.
International Search Report and Written Opinion for International Application PCT/BR2021/050414; International Filing Date: Sep. 27, 2021; Date of Mailing: Oct. 28, 2021; 7 pages.
Silva, J. et al.; [English Abstract] "Uso de fluxofenim em trigo como protetor ao herbicida s-metalochlor"; Arq Inst Biol, vol. 78, Issue No. 3; 2011; pp. 401-407; DOI: https://doi.org/10.1590/1808-1657v78p4012011.

(Continued)

Primary Examiner — David J Blanchard
Assistant Examiner — Sean J Steinke
(74) Attorney, Agent, or Firm — CANTOR COLBURN LLP

(57) ABSTRACT

The present invention relates to a combination for the selective control of weeds. More particularly, the present invention relates to a combination of one or more triazolone herbicides with one or more safeners for the selective control of weeds.

2 Claims, No Drawings

(56)  References Cited

OTHER PUBLICATIONS

Abu-Qare, AW.; et al. "Herbicide safeners: uses, limitations, metabolism, and mechanisms of action." Chemosphere, (2002), 48,965-974. (Year: 2002).

Scharf, M. E.; et al. "Toxicity and Neurophysiological Effects of Fipronil and Fipronil Sulfone on the Western Corn Rootworm (Coleoptera: *Chrysomelidae*)." Arch. Insect Biochem. Physiol., (1999), 40, 150-156. (Year: 1999).

Definition of "cloquintocet"—Google Search (Year: 2025); 5 pages.

Definition of "mefenpyr"—Google Search (Year: 2025); 4 pages.

* cited by examiner

COMBINATIONS OF TRIAZOLONE HERBICIDES WITH SAFENERS

CROSS REFERENCE TO RELATED APPLICATIONS

This application is a National Stage application of PCT/BR2021/050414, filed Sep. 27, 2021, which claims priority to Brazilian Patent Application No. 102020019868-8, filed Sep. 28, 2020, both of which are incorporated by reference in their entirety herein.

FIELD OF THE INVENTION

The present invention relates to a combination for the selective control of weeds. More particularly, the present invention relates to a combination of one or more triazolone herbicides with one or more safeners for the selective control of weeds.

BACKGROUND OF THE INVENTION

Some very effective herbicides i.e. herbicides that exhibit highly effective weed control exhibit toxicity on the crop itself along with weeds. In other words, they exhibit non selective control of weeds to be eliminated. This is also the case with Triazolone herbicides such as Sulfentrazone, Carfentrazone, Azafenidin, Thiencarbazone and Amicarbazone that exhibit excellent weed control but at the cost of damage to crop itself. Sometimes this undesired effect on the crop can be so devastating that whole crop gets wiped out. In such cases, phytotoxicity is said to be 100%. Other instances of unwanted effects of herbicides on crops are lesser plant height or lesser number of plants standing after herbicidal treatments.

Triazolone herbicides cover herbicides that act by different modes of action. Sulfentrazone, Carfentrazone and Azafenidin that act by inhibiting protoporphyrinogen oxidase (PPO) enzyme, Thiencarbazone that acts by inhibiting Acetolactate synthase (ALS) enzyme and Amicarbazone that acts by inhibiting photosynthesis II are examples of Triazolone herbicides. PPO inhibitors work by blocking production of chlorophyll and heme and by attacking and destroying lipids and protein membranes. Acetolactate synthase (ALS) inhibiting herbicides also called acetohydroxyacid synthase (AHAS) inhibiting herbicides inhibit biosynthesis of the branched-chain amino acids isoleucine, leucine, and valine. Photosynthesis II inhibitors act by blocking electron transport and stopping CO2 fixation and production of energy and by causing lipid and protein membrane destruction.

IUPAC name of Sulfentrazone is 2',4'-dichloro-5'-[4-(difluoromethyl)-4,5-dihydro-3-methyl-5-oxo-1H-1,2,4-triazol-1-yl]methanesulfonanilide.

IUPAC name of Carfentrazone is (RS)-2-chloro-3-{2-chloro-5-[4-(difluoromethyl)-4,5-dihydro-3-methyl-5-oxo-1H-1,2,4-triazol-1-yl]-4-fluorophenyl}propionic acid.

IUPAC name of azafenidin is 2-[2,4-dichloro-5-(prop-2-ynyloxy)phenyl]-5,6,7,8-tetrahydro-1,2,4-triazolo[4,3-a]pyridin-3 (2H)-one.

IUPAC name of thiencarbazone is 4-{[(4,5-dihydro-3-methoxy-4-methyl-5-oxo-1H-1,2,4-triazol-1-yl) carbonyl] sulfamoyl}-5-methylthiophene-3-carboxylic acid.

IUPAC name of amicarbazone is 4-amino-N-tert-butyl-4,5-dihydro-3-isopropyl-5-oxo-1H-1,2,4-triazole-1-carboxamide.

Chemical agents called as safeners, when used with herbicides, act as their antidotes and make use of the herbicides safer. However, it is pertinent to note that not all the safeners work well with all the herbicides. Scientists are always faced with the challenge of finding safener herbicide combinations that work well.

There is therefore a need in the art for safener combinations with triazolone herbicides that reduce their phytotoxicity, result in increased plant height and/or increased number of plants standing after herbicidal treatment.

OBJECTS OF THE INVENTION

The present invention, described hereinafter, achieves at least one of the following objects of the invention.

It is an object of the present invention to provide combinations of one or more triazolone herbicides with one or more safeners.

It is an object of the present invention to provide combinations of triazolone herbicides with one or more safeners, wherein triazolone herbicides are selected from one or more of Sulfentrazone, Carfentrazone, Azafenidin, Thiencarbazone and Amicarbazone.

It is an object of the present invention to provide combinations of triazolone herbicides with one or more safeners, wherein triazolone herbicides are selected from one or more of Sulfentrazone, Carfentrazone, Azafenidin, Thiencarbazone and Amicarbazone and said combinations exhibit less or no phytotoxicity.

It is an object of the present invention to provide combinations of triazolone herbicides with one or more safeners, wherein triazolone herbicides are selected from one or more of Sulfentrazone, Carfentrazone, Azafenidin, Thiencarbazone and Amicarbazone and said combinations result in increased plant height.

It is an object of the present invention to provide combinations of triazolone herbicides with one or more safeners, wherein triazolone herbicides are selected from one or more of Sulfentrazone, Carfentrazone, Azafenidin, Thiencarbazone and Amicarbazone and said combinations result in increased number of plants standing after treatment.

It is an object of the present invention to provide combinations of triazolone herbicides with one or more safeners, wherein triazolone herbicides are selected from one or more of Sulfentrazone, Carfentrazone, Azafenidin, Thiencarbazone and Amicarbazone and said combinations exhibit less or no phytotoxicity, result in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

SUMMARY OF THE INVENTION

In an aspect, present invention provides combinations of one or more triazolone herbicides with one or more safeners.

In an aspect, present invention provides combinations of one or more triazolone herbicides with one or more safeners, wherein triazolone herbicides are selected from one or more of Sulfentrazone, Carfentrazone, Azafenidin, Thiencarbazone and Amicarbazone.

In an aspect, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations exhibit less or no phytotoxicity.

In an aspect, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations result in increased plant height.

In an aspect, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations result in increased number of plants standing after treatment.

In an aspect, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations exhibit less or no phytotoxicity, result in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In an aspect, present invention provides combinations of one or more triazolone herbicides with safeners wherein safeners are selected from one or more of Cloquintocet-mexyl, Dichlormid, Benoxacor and Flurazole.

In an aspect, present invention provides combinations of triazolone herbicides with one or more safeners wherein triazolone herbicides are selected from one or more of Sulfentrazone, Carfentrazone, Azafenidin, Thiencarbazone and Amicarbazone and said combinations are applied preferably to corn, wheat, barley, rye, oats, rice, soybean, cotton, canola, sugar beet, potatoes, tobacco, and oil seed rape, more preferably to soybean directly or soil in which their seeds are sown.

In an aspect, present invention provides combinations of one or more triazolone herbicides with one or more safeners selected from Cloquintocet-mexyl, Dichlormid, Benoxacor and Flurazole and said combinations are applied preferably to corn, wheat, barley, rye, oats, rice, soybean, cotton, canola, sugar beet, potatoes, tobacco, and oil seed rape, more preferably to soybean directly or soil in which their seeds are sown.

In an aspect, present invention provides combinations of Sulfentrazone and one or more safeners selected from Cloquintocet-mexyl, Dichlormid, Benoxacor and Flurazole.

In an aspect, present invention provides combinations of Sulfentrazone and one or more safeners selected from Cloquintocet-mexyl, Dichlormid, Benoxacor and Flurazole and said combinations are applied preferably to corn, wheat, barley, rye, oats, rice, soybean, cotton, canola, sugar beet, potatoes, tobacco, and oil seed rape, more preferably to soybean directly or soil in which their seeds are sown.

DETAILED DESCRIPTION OF INVENTION

As used herein, the term "control" includes controlling a pest, i.e. killing, also protecting a plant, or seed from attack or invasion by said pest.

It has surprisingly been found by the present inventors that combination of one or more triazolone herbicides with one or more safeners selectively controls weeds. Selective weed control was also accompanied by increased plant growth and increased number of plants standing after treatments. Treatments with one or more triazolone herbicides alone resulted in phytotoxicity, lesser plant height and lesser number of plants standing after treatments. Selective weed control, increased plant growth and increased number of plants stranding after treatments with combination of one or more triazolone herbicides with one or more safeners were unexpected.

In one embodiment, present invention provides combinations of one or more triazolone herbicides with one or more safeners.

In another embodiment, present invention provides combinations of one or more triazolone herbicides with one or more safeners, wherein triazolone herbicides are selected from one or more of Sulfentrazone, Carfentrazone, Azafenidin, Thiencarbazone and Amicarbazone.

In still another embodiment, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations exhibit less or no phytotoxicity.

In still another embodiment, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations result in increased plant height.

In still another embodiment, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations result in increased number of plants standing after herbicidal treatments.

In still another embodiment, present invention provides combinations of triazolone herbicides with one or more safeners, wherein triazolone herbicides are selected from one or more of Sulfentrazone, Carfentrazone, Azafenidin, Thiencarbazone and Amicarbazone and said combinations exhibit less or no phytotoxicity, result in increased plant height and/or increased number of plants standing after herbicidal treatments, preferably in corn, wheat, barley, rye, oats, rice, soybean, cotton, canola, sugar beet, potatoes, tobacco, and oil seed rape, more preferably in soybean.

In still another embodiment, present invention provides combinations of one or more triazolone herbicides with safeners wherein safeners are selected from one or more of Cloquintocet-mexyl, Dichlormid, Benoxacor and Flurazole.

In still another embodiment, present invention provides combinations of triazolone herbicides with one or more safeners wherein triazolone herbicides are selected from one or more of Sulfentrazone, Carfentrazone, Azafenidin, Thiencarbazone and Amicarbazone and said combinations are applied preferably to corn, wheat, barley, rye, oats, rice, soybean, cotton, canola, sugar beet, potatoes, tobacco, and oil seed rape, more preferably to soybean directly or soil in which their seeds are sown.

In still another embodiment, present invention provides combinations of one or more triazolone herbicides with one or more safeners selected from Cloquintocet-mexyl, Dichlormid, Benoxacor and Flurazole and said combinations are applied preferably to corn, wheat, barley, rye, oats, rice, soybean, cotton, canola, sugar beet, potatoes, tobacco, and oil seed rape, more preferably to soybean directly or soil in which their seeds are sown.

In still another embodiment, present invention provides combinations of Sulfentrazone and one or more safeners selected from Cloquintocet-mexyl, Dichlormid, Benoxacor and Flurazole and said combinations are applied preferably to corn, wheat, barley, rye, oats, rice, soybean, cotton, canola, sugar beet, potatoes, tobacco, and oil seed rape, more preferably to soybean directly or soil in which their seeds are sown.

In still another embodiment, present invention provides combination of Sulfentrazone and Cloquintocet-mexyl and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Dichlormid and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Benoxacor and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Flurazole and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Cloquintocet-mexyl, wherein ratio of Sulfentrazone to Cloquintocet-mexyl is about 50:1 and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Dichlormid, wherein ratio of Sulfentrazone to Dichlormid is from 1.13:1 to 2.27:1 and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Benoxacor, wherein ratio of Sulfentrazone to Benoxacor is from 3.33:1 to 6.66:1 and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Flurazole, wherein ratio of Sulfentrazone to Flurazole is from 8.33:1 to 83.33:1 and said combination exhibits less or no phytotoxicity, results in increased plant height and/or increased number of plants standing after treatment, preferably in corn, wheat, barley, rye, oats, rice, soybean, cotton, canola, sugar beet, potatoes, tobacco, and oil seed rape, more preferably in soybean.

In still another embodiment, present invention provides combination of Sulfentrazone and Cloquintocet-mexyl, wherein Sulfentrazone and Cloquintocet-mexyl are applied preferably to corn, wheat, barley, rye, oats, rice, soybean, cotton, canola, sugar beet, potatoes, tobacco, and oil seed rape, more preferably to soybean, simultaneously or sequentially.

In still another embodiment, present invention provides combination of Sulfentrazone and Dichlormid, wherein Sulfentrazone and Dichlormid are applied preferably to corn, wheat, barley, rye, oats, rice, soybean, cotton, canola, sugar beet, potatoes, tobacco, and oil seed rape, more preferably to soybean, simultaneously or sequentially.

In still another embodiment, present invention provides combination of Sulfentrazone and Benoxacor, wherein Sulfentrazone and Benoxacor are applied preferably to corn, wheat, barley, rye, oats, rice, soybean, cotton, canola, sugar beet, potatoes, tobacco, and oil seed rape, more preferably to soybean, simultaneously or sequentially.

In still another embodiment, present invention provides combination of Sulfentrazone and Flurazole wherein Sulfentrazone and Flurazole are applied preferably to corn, wheat, barley, rye, oats, rice, soybean, cotton, canola, sugar beet, potatoes, tobacco, and oil seed rape, more preferably to soybean, simultaneously or sequentially.

The combinations of one or more triazolone herbicide with one or more safeners according to the instant invention can be applied to the plants, seed of the plants and/or to the locus where the crop and weed plants are growing area under cultivation. The herbicides and safeners of said combinations can be applied simultaneously or in sequential order in both pre- as well as postemergence application.

In still another embodiment, the herbicide safener combination is formulated together and applied in pre-emergence application or post-emergence application.

In still another embodiment, the components are formulated separately and applied sequentially.

In still another embodiment, the safener is applied to the seeds or other propagation material of the crops prior to sowing or to the soil shortly after sowing in an in furrow-treatment.

In still another embodiment, the combination of one or more triazolone herbicides selected from Sulfentrazone, Carfentrazone, Azafenidin, Thiencarbazone and Amicarbazone and one or more safeners selected from Cloquintocet-mexyl, Dichlormid, Benoxacor and Flurazole is formulated together and applied in pre-emergence application or post-emergence application to preferably to corn, wheat, barley, rye, oats, rice, soybean, cotton, canola, sugar beet, potatoes, tobacco, and oil seed rape, more preferably to soybean directly or soil in which their seeds are sown.

In still another embodiment, one or more triazolone herbicides selected from Sulfentrazone, Carfentrazone, Azafenidin, Thiencarbazone and Amicarbazone and one or more safeners selected from Cloquintocet-mexyl, Dichlormid, Benoxacor and Flurazole of the herbicide safener combination are formulated separately and applied sequentially preferably to corn, wheat, barley, rye, oats, rice, soybean, cotton, canola, sugar beet, potatoes, tobacco, and oil seed rape, more preferably to soybean directly or soil in which their seeds are sown.

In still another embodiment, the safener selected from Cloquintocet-mexyl, Dichlormid, Benoxacor and Flurazole is applied to the seeds or other propagation material of the crops prior to sowing or to the soil shortly after sowing in an in furrow-treatment.

In still another embodiment, the combination of Sulfentrazone and Cloquintocet-mexyl is formulated together and applied in pre-emergence application or post-emergence application to preferably to corn, wheat, barley, rye, oats, rice, soybean, cotton, canola, sugar beet, potatoes, tobacco, and oil seed rape, more preferably to soybean directly or soil in which their seeds are sown, wherein ratio of Sulfentrazone and Cloquintocet-mexyl is optionally about 50:1.

In still another embodiment, the combination of Sulfentrazone and Dichlormid is formulated together and applied in pre-emergence application or post-emergence application to preferably to corn, wheat, barley, rye, oats, rice, soybean, cotton, canola, sugar beet, potatoes, tobacco, and oil seed rape, more preferably to soybean directly or soil in which their seeds are sown, wherein ratio of Sulfentrazone and Dichlormid is optionally from 1.13:1 to 2.27:1.

In still another embodiment, the combination of Sulfentrazone and Benoxacor is formulated together and applied in pre-emergence application or post-emergence application preferably to corn, wheat, barley, rye, oats, rice, soybean, cotton, canola, sugar beet, potatoes, tobacco, and oil seed rape, more preferably to soybean directly or soil in which their seeds are sown, wherein ratio of Sulfentrazone and Benoxacor is optionally from 3.33:1 to 6.66:1.

In still another embodiment, the combination of Sulfentrazone and Flurazole is formulated together and applied in pre-emergence application or post-emergence application preferably to corn, wheat, barley, rye, oats, rice, soybean, cotton, canola, sugar beet, potatoes, tobacco, and oil seed rape, more preferably to soybean directly or soil in which their seeds are sown, wherein ratio of Sulfentrazone and Flurazole is optionally from 8.33:1 to 83.33:1.

In still another embodiment, the combination of Sulfentrazone and Cloquintocet-mexyl is formulated together and applied in pre-emergence application or post-emergence application to preferably to corn, wheat, barley, rye, oats, rice, soybean, cotton, canola, sugar beet, potatoes, tobacco, and oil seed rape, more preferably to soybean directly or soil in which their seeds are sown, wherein Sulfentrazone is applied at the rate of 500 g ai/ha and Cloquintocet-mexyl is applied at the rate of 10.1 g ai/ha.

In still another embodiment, the combination of Sulfentrazone and Dichlormid is formulated together and applied in pre-emergence application or post-emergence application to preferably to corn, wheat, barley, rye, oats, rice, soybean, cotton, canola, sugar beet, potatoes, tobacco, and oil seed rape, more preferably to soybean directly or soil in which their seeds are sown, wherein Sulfentrazone is applied at the rate of 500 g ai/ha and Dichlormid is applied at the rate of range from 220 to 440 g ai/ha, preferably at 220 or 440 g ai/ha.

In still another embodiment, the combination of Sulfentrazone and Benoxacor is formulated together and applied in pre-emergence application or post-emergence application preferably to corn, wheat, barley, rye, oats, rice, soybean, cotton, canola, sugar beet, potatoes, tobacco, and oil seed rape, more preferably to soybean directly or soil in which their seeds are sown, wherein Sulfentrazone is applied at the rate of 500 g ai/ha and Benoxacor is applied at the rate of range from 75 to 150 g ai/ha, preferably at 75 or 150 g ai/ha.

In still another embodiment, the combination of Sulfentrazone and Flurazole is formulated together and applied in pre-emergence application or post-emergence application preferably to corn, wheat, barley, rye, oats, rice, soybean, cotton, canola, sugar beet, potatoes, tobacco, and oil seed rape, more preferably to soybean directly or soil in which their seeds are sown, wherein Sulfentrazone is applied at the rate of 500 g ai/ha and Flurazole is applied at the rate of range from 6 to 60 g ai/ha, preferably at 6 or 60 g ai/ha.

The herbicide safener compositions of the present invention can reduce phytotoxicity of triazolone herbicides and therefore provide selective control of weeds.

As will be demonstrated in the examples, the combinations of one or more triazolone herbicides with one or more safeners reduced phytotoxicity of herbicides, resulted in increased height of plants and/or increased number of plants standing after treatments.

These and other advantages of the invention may become more apparent from the examples set forth herein below. These examples are provided merely as illustrations of the invention and are not intended to be construed as a limitation thereof.

EXAMPLES

Experiments were carried out to evaluate the phytotoxicity, effect on plant height and effect on number of plants standing after treatments with combinations of one or more triazolone herbicides with one or more safeners.

Below table gives summary of the formulation details and application details of Sulfentrazone and Mefenpyr-diethyl, Isoxadifen-ethyl and Cloquintocet-mexyl that were used in combination with Sulfentrazone for treatments. Application method was spray and applications were made to soil.

TABLE 1

| Treatment Number | Treatment components | Formulation details | Application details |
|---|---|---|---|
| 1. | Untreated check | — | — |
| 2. | Sulfentrazone | 500 g/L SC | 500 g ai/ha |
| 3. | Sulfentrazone + Mefenpyrdiethyl | 500 g/L SC + 450 g/L EC | 500 g ai/ha + 22.5 g ai/ha |
| 4. | Sulfentrazone + Mefenpyrdiethyl | 500 g/L SC + 450 g/L EC | 500 g ai/ha + 225 g ai/ha |
| 5. | Sulfentrazone + Isoxadifenethyl | 500 g/L SC + 82 g/L EC | 500 g ai/ha + 35 g ai/ha |
| 6. | Sulfentrazone + Isoxadifenethyl | 500 g/L SC + 82 g/L EC | 500 g ai/ha + 350 g ai/ha |
| 7. | Sulfentrazone + Cloquintocet-mexyl | 500 g/L SC + 160 g/L EC | 500 g ai/ha + 10.1 g ai/ha |
| 8. | Sulfentrazone + Cloquintocet-mexyl | 500 g/L SC + 160 g/L EC | 500 g ai/ha + 100 g ai/ha |

Below table gives summary of the formulation details and application details of Sulfentrazone and Dichlormid, Fenclorim, Benoxacor, Flurazole and Fluxofenim that were used in combination with Sulfentrazone for treatments. Application method was spray and applications were made to soil.

TABLE 2

| Treatment Number | Treatment components | Formulation details | Application details |
|---|---|---|---|
| 9. | Untreated check | — | — |
| 10. | Sulfentrazone | 500 g/L SC | 500 g ai/ha |
| 11. | Sulfentrazone + Dichlormid | 500 g/L SC + 450 g/L EC | 500 g ai/ha + 220 g ai/ha |
| 12. | Sulfentrazone + Dichlormid | 500 g/L SC + 450 g/L EC | 500 g ai/ha + 440 g ai/ha |
| 13. | Sulfentrazone + Fenclorim | 500 g/L SC + 220 g/L EC | 500 g ai/ha + 150 g ai/ha |
| 14. | Sulfentrazone + Fenclorim | 500 g/L SC + 220 g/L EC | 500 g ai/ha + 300 g ai/ha |
| 15. | Sulfentrazone + Benoxacor | 500 g/L SC + 160 g/L EC | 500 g ai/ha + 75 g ai/ha |
| 16. | Sulfentrazone + Benoxacor | 500 g/L SC + 160 g/L EC | 500 g ai/ha + 150 g ai/ha |
| 17. | Sulfentrazone + Flurazole | 500 g/L SC + 400 g/Kg WP | 500 g ai/ha + 6 g ai/ha |

TABLE 2-continued

| Treatment Number | Treatment components | Formulation details | Application details |
|---|---|---|---|
| 18. | Sulfentrazone + Flurazole | 500 g/L SC + 400 g/Kg WP | 500 g ai/ha + 60 g ai/ha |
| 19. | Sulfentrazone + Fluxofenim | 500 g/L SC + 958 g/L EC | 500 g ai/ha + 5.75 g ai/ha |
| 20. | Sulfentrazone + Fluxofenim | 500 g/L SC + 958 g/L EC | 500 g ai/ha + 60.4 g ai/ha |

Below table gives summary of % weed control shown in soybean crop by untreated check, Sulfentrazone alone and combination of Sulfentrazone with Mefenpyr-diethyl, Isoxadifen-ethyl and Cloquintocet-mexyl at different application rates. % weed control was checked for weed *Brachiaria decumbens*.

TABLE 3

| Treatment Number | Treatment components | Application details | 7 DAA* | 14 DAA* | 21 DAA* | 28 DAA* | 35 DAA* |
|---|---|---|---|---|---|---|---|
| | | | % Weed Control | | | | |
| 1. | Untreated check | — | 0 | 0 | 0 | 0 | 0 |
| 2. | Sulfentrazone | 500 g ai/ha | 100 | 100 | 100 | 100 | 100 |
| 3. | Sulfentrazone + Mefenpyr-diethyl | 500 g ai/ha + 22.5 g ai/ha | 100 | 100 | 100 | 100 | 100 |
| 4. | Sulfentrazone + Mefenpyr-diethyl | 500 g ai/ha + 225 g ai/ha | 97.5 | 97.5 | 98.8 | 98.8 | 98.8 |
| 5. | Sulfentrazone + Isoxadifen-ethyl | 500 g ai/ha + 35 g ai/ha | 98.8 | 98.8 | 100 | 100 | 100 |
| 6. | Sulfentrazone + Isoxadifen-ethyl | 500 g ai/ha + 350 g ai/ha | 93.8 | 93.8 | 96.3 | 96.3 | 96.3 |
| 7. | Sulfentrazone + Cloquintocet-mexyl | 500 g ai/ha + 10.1 g ai/ha | 100 | 100 | 98.8 | 98.8 | 98.8 |
| 8. | Sulfentrazone + Cloquintocet-mexyl | 500 g ai/ha + 100 g ai/ha | 96.3 | 96.3 | 98.3 | 98.3 | 98.3 |

* DAA—Days after administration. All the values for % weed control in table above are average of 4 replications.

Below table gives summary of % weed control in soybean crop shown by untreated check, Sulfentrazone alone and combination of Sulfentrazone with Dichlormid, Fenclorim, Benoxacor, Flurazole and Fluxofenim at different application rates. % weed control was checked for weed *Brachiaria decumbens*.

TABLE 4

| Treatment Number | Treatment component | Application details | 7 DAA* | 14 DAA* | 21 DAA* | 28 DAA* | 35 DAA* |
|---|---|---|---|---|---|---|---|
| | | | % Weed Control | | | | |
| 9. | Untreated check | — | 0 | 0 | 0 | 0 | 0 |
| 10. | Sulfentrazone | 500 g ai/ha | 100 | 100 | 100 | 100 | 100 |

TABLE 4-continued

| Treatment Number | Treatment component | Application details | 7 DAA* | 14 DAA* | 21 DAA* | 28 DAA* | 35 DAA* |
|---|---|---|---|---|---|---|---|
| | | | % Weed Control | | | | |
| 11. | Sulfentrazone + Dichlormid | 500 g ai/ha + 220 g ai/ha | 98.8 | 100.0 | 100.0 | 100.0 | 100.0 |
| 12. | Sulfentrazone + Dichlormid | 500 g ai/ha + 440 g ai/ha | 96.3 | 100.0 | 100.0 | 100.0 | 100.0 |
| 13. | Sulfentrazone + Fenclorim | 500 g ai/ha + 150 g ai/ha | 83.8 | 92.5 | 95.0 | 92.5 | 92.5 |
| 14. | Sulfentrazone + Fenclorim | 500 g ai/ha + 300 g ai/ha | 92.5 | 95.0 | 95.0 | 95.0 | 95.0 |
| 15. | Sulfentrazone + Benoxacor | 500 g ai/ha + 75 g ai/ha | 95.0 | 95.0 | 95.0 | 95.0 | 95.0 |
| 16. | Sulfentrazone + Benoxacor | 500 g ai/ha + 150 g ai/ha | 77.5 | 90.0 | 71.3 | 90.0 | 90.0 |
| 17. | Sulfentrazone + Flurazole | 500 g ai/ha + 6 g ai/ha | 92.5 | 96.3 | 96.3 | 96.3 | 96.3 |
| 18. | Sulfentrazone + Flurazole | 500 g ai/ha + 60 g ai/ha | 95.0 | 96.3 | 97.5 | 97.5 | 97.5 |
| 19. | Sulfentrazone + Fluxofenim | 500 g ai/ha + 5.75 g ai/ha | 98.8 | 100.0 | 100.0 | 100.0 | 100.0 |
| 20. | Sulfentrazone + Fluxofenim | 500 g ai/ha + 60.4 g ai/ha | 88.8 | 95.0 | 95.0 | 95.0 | 95.0 |

* DAA—Days after administration. All the values for % weed control in table above are average of 4 replications.

Below table gives summary of % phytotoxicity shown in soybean crop by untreated check. Sulfentrazone alone and combination of Sulfentrazone with Mefenpyr-diethyl. Isoxadifen-ethyl and Cloquintocet-mexyl at different application rates.

TABLE 5

| Treatment number | Treatment components | Application Details | 7 DAA* | 14 DAA* | 21 DAA* | 28 DAA* | 35 DAA* |
|---|---|---|---|---|---|---|---|
| | | | % Phytotoxicity | | | | |
| 1. | Untreated check | — | 0 | 0 | 0 | 0 | 0 |

TABLE 5-continued

| Treatment number | Treatment components | Application Details | % Phytotoxicity | | | | |
| --- | --- | --- | --- | --- | --- | --- | --- |
| | | | 7 DAA* | 14 DAA* | 21 DAA* | 28 DAA* | 35 DAA* |
| 2. | Sulfentrazone | 500 g ai/ha | 38.8 | 43.8 | 53.8 | 55.0 | 56.3 |
| 3. | Sulfentrazone + Mefenpyr-diethyl | 500 g ai/ha + 22.5 g ai/ha | 45.0 | 51.3 | 60.0 | 60.0 | 65.0 |
| 4. | Sulfentrazone + Mefenpyr-diethyl | 500 g ai/ha + 225 g ai/ha | 45.0 | 53.8 | 61.3 | 61.3 | 63.8 |
| 5. | Sulfentrazone + Isoxadifen-ethyl | 500 g ai/ha + 35 g ai/ha | 43.3 | 55.0 | 61.3 | 61.3 | 67.5 |
| 6. | Sulfentrazone + Isoxadifen-ethyl | 500 g ai/ha + 350 g ai/ha | 38.8 | 47.5 | 51.3 | 51.3 | 51.3 |
| 7. | Sulfentrazone + Cloquintocet-mexyl | 500 g ai/ha + 10.1 g ai/ha | 37.5 | 47.5 | 50.0 | 50.0 | 53.8 |
| 8. | Sulfentrazone + Cloquintocet-mexyl | 500 g ai/ha + 100 g ai/ha | 35.5 | 47.5 | 58.8 | 60.0 | 62.5 |

* Days after administration. All the values for % phytotoxicity in table above are average of 4 replications.

It is evident from above table that combinations of Sulfentrazone with Mefenpyr-diethyl, at both application rates, Isoxadifen-ethyl at both application rates, Cloquintocet-mexyl at higher application rate exhibited more phytotoxicity as compared to single Sulfentrazone treatment. Combinations of Sulfentrazone with Cloquintocet-mexyl at lower rate resulted in less phytotoxicity as compared to single Sulfentrazone treatment.

Below table gives summary of % phytotoxicity in soybean crop shown by untreated check, Sulfentrazone alone and combination of Sulfentrazone with Dichlormid, Fenclorim, Benoxacor, Flurazole and Fluxofenim at different application rates.

TABLE 6

| Treatment number | Treatment components | Application Details | % Phytotoxicity | | | | |
| --- | --- | --- | --- | --- | --- | --- | --- |
| | | | 7 DAA* | 14 DAA* | 21 DAA* | 28 DAA* | 35 DAA* |
| 9. | Untreated check | — | 0 | 0 | 0 | 0 | 0 |
| 10. | Sulfentrazone | 500 g ai/ha | 28.8 | 27.5 | 23.8 | 20.0 | 17.5 |
| 11. | Sulfentrazone + Dichlormid | 500 g ai/ha + 220 g ai/ha | 31.3 | 21.3 | 15.0 | 13.8 | 12.0 |

TABLE 6-continued

| Treatment number | Treatment components | Application Details | % Phytotoxicity | | | | |
| --- | --- | --- | --- | --- | --- | --- | --- |
| | | | 7 DAA* | 14 DAA* | 21 DAA* | 28 DAA* | 35 DAA* |
| 12. | Sulfentrazone + Dichlormid | 500 g ai/ha + 440 g ai/ha | 33.3 | 21.3 | 16.3 | 13.8 | 13.8 |
| 13. | Sulfentrazone + Fenclorim | 500 g ai/ha + 150 g ai/ha | 38.8 | 43.8 | 42.5 | 40.0 | 37.5 |
| 14. | Sulfentrazone + Fenclorim | 500 g ai/ha + 300 g ai/ha | 27.5 | 21.3 | 20.0 | 20.0 | 18.8 |
| 15. | Sulfentrazone + Benoxacor | 500 g ai/ha + 75 g ai/ha | 25.0 | 16.3 | 15.0 | 16.3 | 15.0 |
| 16. | Sulfentrazone + Benoxacor | 500 g ai/ha + 150 g ai/ha | 35.0 | 25.0 | 13.8 | 18.8 | 16.3 |
| 17. | Sulfentrazone + Flurazole | 500 g ai/ha + 6 g ai/ha | 31.3 | 23.8 | 16.3 | 20.0 | 16.3 |
| 18. | Sulfentrazone + Flurazole | 500 g ai/ha + 60 g ai/ha | 30.0 | 23.8 | 20.0 | 15.0 | 15.0 |
| 19. | Sulfentrazone + Fluxofenim | 500 g ai/ha + 5.75 g ai/ha | 37.5 | 38.8 | 35.0 | 33.8 | 32.5 |
| 20. | Sulfentrazone + Fluxofenim | 500 g ai/ha + 60.4 g ai/ha | 35.0 | 31.3 | 18.8 | 27.5 | 25.0 |

* DAA—Days after administration. All the values for % phytotoxicity in table above are average of 4 replications.

It is evident from above table that combinations of Sulfentrazone with Fenchlorim and Fluxofenim at both application rates exhibited same or more phytotoxicity as compared to single Sulfentrazone treatment. Combinations of Sulfentrazone with Dichlormid, Benoxacor, Flurazole at both application rates resulted in less phytotoxicity as compared to single Sulfentrazone treatment.

Below table gives summary of effect on plant height of soybean plant shown by untreated check, Sulfentrazone alone and combination of Sulfentrazone with Mefenpyr-diethyl, Isoxadifen-ethyl and Cloquintocet-mexyl at different application rates.

TABLE 7

| Treatment Number | Treatment components | Application Details | Plant height | |
| --- | --- | --- | --- | --- |
| | | | 14 DAA* | 28 DAA* |
| 1. | Untreated check | — | 6.03 | 9.20 |

TABLE 7-continued

| Treatment | Treatment | Application | Plant height | |
|---|---|---|---|---|
| Number | components | Details | 14 DAA* | 28 DAA* |
| 2. | Sulfentrazone | 500 g ai/ha | 2.90 | 5.15 |
| 3. | Sulfentrazone + Mefenpyrdiethyl | 500 g ai/ha + 22.5 g ai/ha | 1.75 | 3.75 |
| 4. | Sulfentrazone + Mefenpyrdiethyl | 500 g ai/ha + 225 g ai/ha | 2.50 | 4.15 |
| 5. | Sulfentrazone + Isoxadifenethyl | 500 g ai/ha + 35 g ai/ha | 2.20 | 3.80 |
| 6. | Sulfentrazone + Isoxadifenethyl | 500 g ai/ha + 350 g ai/ha | 3.35 | 5.30 |
| 7. | Sulfentrazone + Cloquintocetmexyl | 500 g ai/ha + 10.1 g ai/ha | 4.30 | 5.95 |
| 8. | Sulfentrazone + Cloquintocetmexyl | 500 g ai/ha + 100 g ai/ha | 3.43 | 5.25 |

*DAA-Days after administration. All the values for plant height in table above are average of 4 replications.

It is evident from above table that combinations of Sulfentrazone with Mefenpyr-diethyl, at both application rates, Isoxadifen-ethyl at lower rate resulted in lesser plant height as compared to single Sulfentrazone treatment. Combinations of Sulfentrazone with Isoxadifen-ethyl at higher application rate, Cloquintocet-mexyl at both application rates resulted in as increase in plant height compared to single Sulfentrazone treatment.

Below table gives summary of effect on plant height of soybean plant shown by untreated check, Sulfentrazone alone and combination of Sulfentrazone with Dichlormid, Fenclorim, Benoxacor, Flurazole and Fluxofenim at different application rates.

TABLE 8

| Treatment | Treatment | Application | Plant Height | |
|---|---|---|---|---|
| Number | components | Details | 14 DAA* | 28 DAA* |
| 9. | Untreated check | — | 8.25 | 12.75 |
| 10. | Sulfentrazone | 500 g ai/ha | 6.65 | 10.90 |
| 11. | Sulfentrazone + Dichlormid | 500 g ai/ha + 220 g ai/ha | 6.15 | 11.60 |
| 12. | Sulfentrazone + Dichlormid | 500 g ai/ha + 440 g ai/ha | 5.45 | 10.45 |
| 13. | Sulfentrazone + Fenclorim | 500 g ai/ha + 150 g ai/ha | 2.95 | 4.80 |
| 14. | Sulfentrazone + Fenclorim | 500 g ai/ha + 300 g ai/ha | 5.40 | 9.70 |
| 15. | Sulfentrazone + Benoxacor | 500 g ai/ha + 75 g ai/ha | 6.53 | 10.65 |
| 16. | Sulfentrazone + Benoxacor | 500 g ai/ha + 150 g ai/ha | 7.38 | 13.15 |
| 17. | Sulfentrazone + Flurazole | 500 g ai/ha + 6 g ai/ha | 7.50 | 12.30 |
| 18. | Sulfentrazone + Flurazole | 500 g ai/ha + 60 g ai/ha | 6.30 | 12.00 |
| 19. | Sulfentrazone + Fluxofenim | 500 g ai/ha + 5.75 g ai/ha | 4.23 | 8.05 |
| 20. | Sulfentrazone + Fluxofenim | 500 g ai/ha + 60.4 g ai/ha | 5.53 | 9.60 |

*DAA-Days after administration. All the values for plant height in table above are average of 4 replications.

It is evident from above table that combinations of Sulfentrazone with Dichlormid at both application rates, Fenclorim at both application rates, Fluxofenim at both application rates, Benoxacor at lower application rate, Flurazole at higher application rate resulted in lesser plant height as compared to single Sulfentrazone treatment. Combinations of Sulfentrazone with Benoxacor at higher application rate, Flurazole at lower application rate resulted in as increase in plant height compared to single Sulfentrazone treatment.

Below table gives summary of effect on number of soybean plants standing after herbicidal treatment shown by untreated check, Sulfentrazone alone and combination of Sulfentrazone with Mefenpyr-diethyl, Isoxadifen-ethyl and Cloquintocet-mexyl at different application rates.

TABLE 9

| Treatment | Treatment | Application | Number of plants standing | |
|---|---|---|---|---|
| Number | components | Details | 14 DAA* | 28 DAA |
| 1. | Untreated check | — | 6.3 | 5.5 |
| 2. | Sulfentrazone | 500 g ai/ha | 5.3 | 4.5 |
| 3. | Sulfentrazone + Mefenpyr-diethyl | 500 g ai/ha + 22.5 g ai/ha | 3.8 | 3.3 |
| 4. | Sulfentrazone + Mefenpyr-diethyl | 500 g ai/ha + 225 g ai/ha | 5.0 | 4.0 |
| 5. | Sulfentrazone + Isoxadifen-ethyl | 500 g ai/ha + 35 g ai/ha | 4.5 | 3.8 |
| 6. | Sulfentrazone + Isoxadifen-ethyl | 500 g ai/ha + 350 g ai/ha | 5.0 | 4.5 |
| 7. | Sulfentrazone + Cloquintocet-mexyl | 500 g ai/ha + 10.1 g ai/ha | 6.5 | 5.3 |
| 8. | Sulfentrazone + Cloquintocet-mexyl | 500 g ai/ha + 100 g ai/ha | 5.5 | 5.0 |

*DAA-Days after administration. All the values for number of plants standing in table above are average of 4 replications.

It is evident from above table that combinations of Sulfentrazone with Mefenpyr-diethyl, at both application rates, Isoxadifen-ethyl at both application rates resulted in lesser number of standing plants as compared to single Sulfentrazone treatment. Combinations of Sulfentrazone with Cloquintocet-mexyl at both application rates resulted in increased number of standing plants compared to single Sulfentrazone treatment.

Below table gives summary of effect on number of soybean plants standing after herbicidal treatment shown by untreated check, Sulfentrazone alone and combination of Sulfentrazone with Dichlormid, Fenclorim, Benoxacor, Flurazole and Fluxofenim at different application rates.

TABLE 10

| Treatment | Treatment | Application | Number of plants standing | |
|---|---|---|---|---|
| Number | components | Details | 14 DAA* | 28 DAA* |
| 9. | Untreated check | — | 6.5 | 6.0 |
| 10. | Sulfentrazone | 500 g ai/ha | 5.3 | 5.3 |
| 11. | Sulfentrazone + Dichlormid | 500 g ai/ha + 220 g ai/ha | 6.3 | 5.5 |
| 12. | Sulfentrazone + Dichlormid | 500 g ai/ha + 440 g ai/ha | 4.8 | 4.0 |
| 13. | Sulfentrazone + Fenclorim | 500 g ai/ha + 150 g ai/ha | 2.5 | 2.5 |
| 14. | Sulfentrazone + Fenclorim | 500 g ai/ha + 300 g ai/ha | 4.5 | 4.0 |
| 15. | Sulfentrazone + Benoxacor | 500 g ai/ha + 75 g ai/ha | 5.8 | 5.5 |
| 16. | Sulfentrazone + Benoxacor | 500 g ai/ha + 150 g ai/ha | 4.5 | 4.5 |
| 17. | Sulfentrazone + Flurazole | 500 g ai/ha + 6 g ai/ha | 5.8 | 5.3 |
| 18. | Sulfentrazone + Flurazole | 500 g ai/ha + 60 g ai/ha | 5.5 | 5.3 |
| 19. | Sulfentrazone + Fluxofenim | 500 g ai/ha + 5.75 g ai/ha | 4.0 | 4.0 |
| 20. | Sulfentrazone + Fluxofenim | 500 g ai/ha + 60.4 g ai/ha | 6.8 | 6.5 |

*DAA-Days after administration. All the values for number of plants standing in table above are average of 4 replications.

It is evident from above table that combinations of Sulfentrazone with Dichlormid at higher application rates. Fenclorim at both application rates. Benoxacor at higher application rate. Fluxofenim at lower application rate resulted in decreased number of standing plants as compared to single Sulfentrazone treatment. Combinations of Sulfentrazone with Flurazole at both application rates, Dichlormid at lower application rates, Benoxacor at lower application rate, Fluxofenim at higher application rate resulted in increased number of standing plants compared to single Sulfentrazone treatment.

The invention claimed is:

1. An herbicide combination consisting of:

a. sulfentrazone; and b. at least one safener, wherein said at least one safener is selected from the group consisting of mefenpyr-diethyl, isoxadifen-ethyl, cloquintocet-mexyl, dichlormid, flurazole, fluxofenim, and combinations thereof.

2. A method of controlling weeds at a locus comprising applying the herbicide combination as claimed in claim 1 to the locus.

* * * * *